(12) United States Patent
Kumar et al.

(10) Patent No.: US 11,382,106 B2
(45) Date of Patent: Jul. 5, 2022

(54) NETWORK SYMBOL DISPLAY FOR DUAL CONNECTIVITY NETWORKS

(71) Applicant: T-Mobile USA, Inc., Bellevue, WA (US)

(72) Inventors: Dinesh Kumar, Sammamish, WA (US); Ming Shan Kwok, Seattle, WA (US); Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 149 days.

(21) Appl. No.: 16/855,821

(22) Filed: Apr. 22, 2020

(65) Prior Publication Data

US 2021/0337550 A1    Oct. 28, 2021

(51) Int. Cl.
*H04W 72/08* (2009.01)
*G06F 3/14* (2006.01)
(Continued)

(52) U.S. Cl.
CPC ............ *H04W 72/085* (2013.01); *G06F 3/14* (2013.01); *H04W 24/08* (2013.01); *H04W 72/0453* (2013.01); *H04W 88/06* (2013.01)

(58) Field of Classification Search
CPC ........... H04W 72/042; H04W 72/0446; H04W 72/0453; H04W 76/27; H04W 88/06;
(Continued)

(56) References Cited

U.S. PATENT DOCUMENTS 8,565,747 B2    10/2013    Karaoguz et al.
8,843,181 B2    9/2014    Seibert et al.
(Continued)

FOREIGN PATENT DOCUMENTS

GB    2505680 A    3/2014
WO    WO2016116145 A1    7/2016
(Continued)

OTHER PUBLICATIONS

Office Action for U.S. Appl. No. 16/791,969, dated Jan. 6, 2021, Humbert, "Service Type Symbols", 14 Pages.
(Continued)

*Primary Examiner* — Kwasi Karikari
(74) *Attorney, Agent, or Firm* — Lee & Hayes, P.C.

(57) ABSTRACT

A wireless communication system may support two types of networks, such as a $4^{th}$-Generation (4G) network and a $5^{th}$-Generation (5G) network. The 4G network is accessed through Long-Term Evolution (LTE) base stations. The 5G network is accessed through New Radio (NR) base stations. An LTE base station can be configured to broadcast information regarding whether it supports Non-Standalone Architecture (NSA) Dual Connectivity in conjunction with an associated NR base station. When a communication device receives an indication that NSA Dual Connectivity is available, the communication device selects a decision value based on the frequency bands that would be used during an NSA session anchored by the LTE base station. The communication device then uses the decision value in combination with the current 4G signal strength to determine whether 5G communications are currently available and whether to display a 5G symbol on the status bar of the communication device.

17 Claims, 3 Drawing Sheets

(51) Int. Cl.
*H04W 72/04* (2009.01)
*H04W 24/08* (2009.01)
*H04W 88/06* (2009.01)

(58) Field of Classification Search
CPC ..... H04W 76/15; H04W 48/18; H04W 24/10; H04W 72/044; H04W 72/085; H04W 16/14; H04W 36/0069; H04W 76/19; H04W 76/20; H04W 28/0967; H04W 48/20; H04W 60/005; H04W 72/087; H04W 72/1231
See application file for complete search history.

(56) References Cited

U.S. PATENT DOCUMENTS

| | | | |
|---|---|---|---|
| 9,031,606 | B2 | 5/2015 | Daniel |
| 9,277,345 | B2 | 3/2016 | Lui et al. |
| 9,615,304 | B2 | 4/2017 | Breuer et al. |
| 9,628,115 | B1 | 4/2017 | Tsai et al. |
| 9,907,007 | B1 | 2/2018 | Xue et al. |
| 10,027,573 | B2 | 7/2018 | Shaw et al. |
| 10,397,840 | B2 | 8/2019 | Shaw et al. |
| 2006/0062149 | A1 | 3/2006 | Bednasz |
| 2008/0014934 | A1 | 1/2008 | Balasubramanian et al. |
| 2009/0137247 | A1 | 5/2009 | Mok |
| 2010/0099405 | A1 | 4/2010 | Brisebois et al. |
| 2010/0135183 | A1 | 6/2010 | Suzuki et al. |
| 2012/0258715 | A1 | 10/2012 | Souissi et al. |
| 2013/0110565 | A1 | 5/2013 | Means, Jr. et al. |
| 2013/0237220 | A1 | 9/2013 | Lee et al. |
| 2015/0045020 | A1 | 2/2015 | Wang et al. |
| 2015/0173004 | A1 | 6/2015 | Nigam et al. |
| 2015/0271317 | A1 | 9/2015 | Nelson et al. |
| 2016/0192370 | A1 | 6/2016 | Chan et al. |
| 2016/0227475 | A1 | 8/2016 | Zhu et al. |
| 2016/0249268 | A1 | 8/2016 | Usui et al. |
| 2018/0019857 | A1 | 1/2018 | Kazmi et al. |
| 2018/0075798 | A1 | 3/2018 | Nho et al. |
| 2018/0082633 | A1 | 3/2018 | Tan et al. |
| 2018/0332659 | A1 | 11/2018 | Hwang et al. |
| 2018/0368016 | A1* | 12/2018 | Lee ..................... H04B 17/318 |
| 2019/0069205 | A1 | 2/2019 | Lee et al. |
| 2019/0069229 | A1 | 2/2019 | Lee et al. |
| 2019/0268962 | A1* | 8/2019 | Wang ..................... H04L 5/0023 |
| 2019/0379469 | A1 | 12/2019 | Lu et al. |
| 2020/0037387 | A1* | 1/2020 | Lee ..................... H04W 48/16 |
| 2020/0068456 | A1 | 2/2020 | Humbert et al. |
| 2020/0068638 | A1 | 2/2020 | Au et al. |
| 2020/0084682 | A1 | 3/2020 | Wang et al. |
| 2020/0092774 | A1 | 3/2020 | Sharma et al. |
| 2020/0112845 | A1 | 4/2020 | Zhao et al. |
| 2020/0344839 | A1 | 10/2020 | Kwok et al. |
| 2021/0258746 | A1 | 8/2021 | Humbert et al. |
| 2021/0385626 | A1 | 12/2021 | Humbert et al. |

FOREIGN PATENT DOCUMENTS

| | | |
|---|---|---|
| WO | WO2016188701 A1 | 12/2016 |
| WO | WO2017196106 A1 | 11/2017 |

OTHER PUBLICATIONS

Office Action for U.S. Appl. No. 16/442,040, dated Feb. 18, 2021, Kwok, "5G Wireless Network Connection Symbol Policy", 17 Pages.

The Extended European Search Report dated Sep. 23, 2020 for European Patent Application No. 20168539.3, 10 pages.

"LS Reply to 3GPP SA2 on Status Icon related to 5G", retrieved on Jan. 21, 2018 at <<http://www.3gpp.org/ftp/Meetings%5F3GPP%5FSYNC/SA2/Docs/>>, [retrieved on 2018—vol. SA WG2, No. Gothenburg, Sweden: Jan. 22, 2018-Jan. 26, 2018, 3GPP Draft, 3rd Generation Partnership Prockect (3GPP), Jan. 2018, pp. 1-4.

Office Action for U.S. Appl. No. 16/120,605, dated Oct. 8, 2020, Lu, "Network Symbol Display in Dual Connectivity Regions", 13 Pages.

Office Action for U.S. Appl. No. 16/442,040, dated Nov. 10, 2020, Kwok, "5G Wireless Network Connection Symbol Policy", 14 Pages.

Intel Corporation, "Dual Registration Solution for 5GS/EPS Interworking", R2-1802964, 3GPP TSG RAN WG2 Meeting #101, Athens, Greece, Feb. 16, 2018, pp. 1-3.

Office Action for U.S. Appl. No. 16/378,179, dated Jan. 24, 2020, Lu, "Variable Interval Signal Scanning in Dual Connectivity Communication Networks", 10 Pages.

Office Action for U.S. Appl. No. 16/378,179, dated Apr. 2, 2020, Lu, "Variable Interval Signal Scanning in Dual Connectivity Communication Networks", 9 Pages.

Office Action for U.S. Appl. No. 16/378,202, dated Nov. 22, 2019, Humbert, Displaying Network Availability in Dual Connectivity Networks, 10 pages.

Office Action for U.S. Appl. No. 16/378,179, dated Aug. 15, 2019, Lu, "Variable Interval Signal Scanning in Dual Connectivity Communication Networks", 8 pages.

The PCT Search Report and Written Opinion dated Oct. 1, 2019, for PCT Application No. PCT/US2019/034110, 11 pages.

The PCT Search Report and Written Opinion dated Dec. 30, 2019 for PCT Application No. PCT/US2019/047553, 12 pages.

Office Action for U.S. Appl. No. 16/120,605, dated May 26, 2020, Lu, "Network Symbol Display in Dual Connectivity Regions", 11 Pages.

Office Action for U.S. Appl. No. 16/442,040, dated Jul. 20, 2020, Kwok, "5G Wireless Network Connection Symbol Policy", 11 Pages.

Office Action for U.S. Appl. No. 16/378,179, dated Jun. 25, 2020, Lu, "Variable Interval Signal Scanning in Dual Connectivity Communication Networks", 10 pages.

* cited by examiner

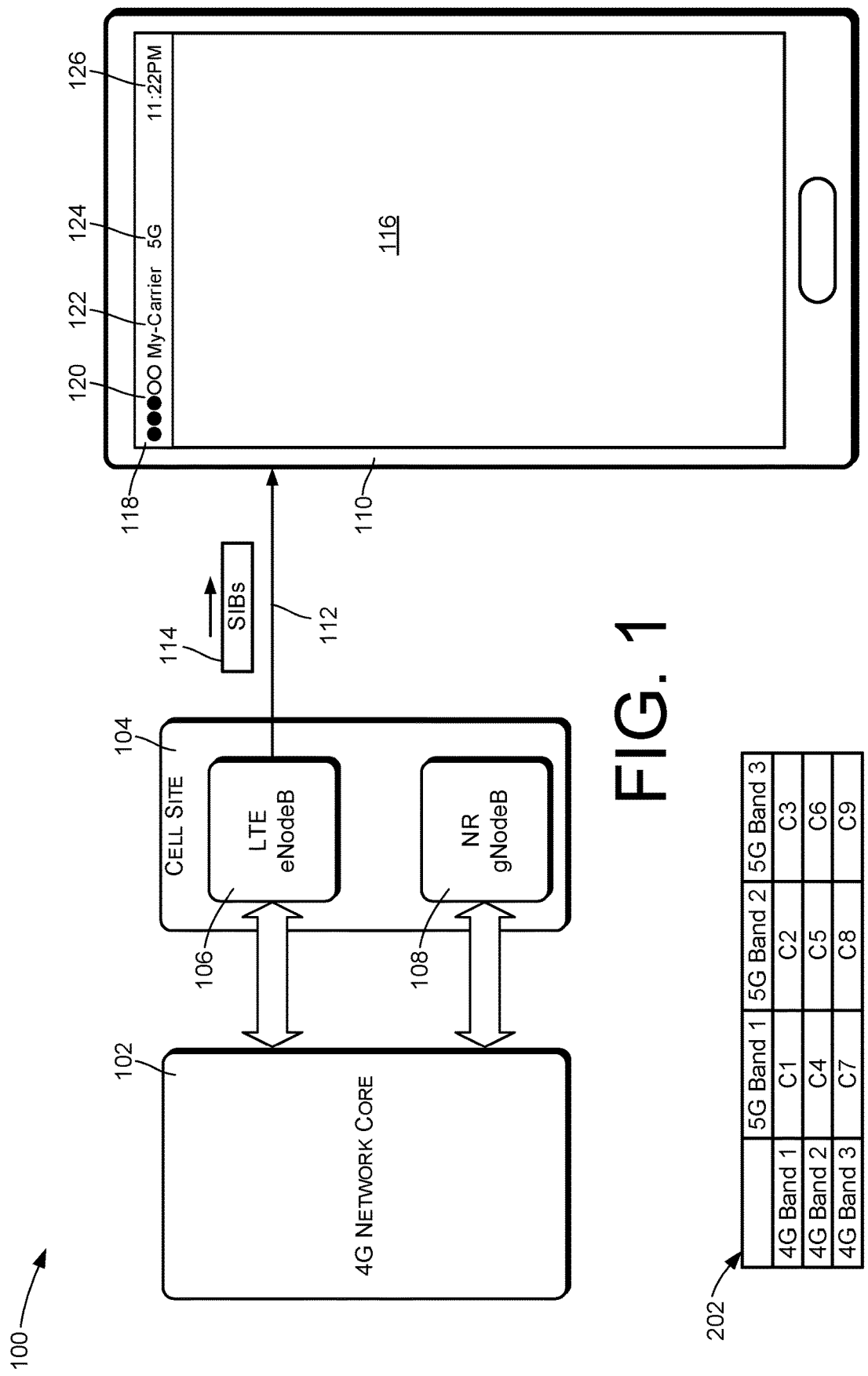

NETWORK SYMBOL DISPLAY FOR DUAL CONNECTIVITY NETWORKS

BACKGROUND

Cellular communication devices use various network radio access technologies to communicate wirelessly with geographically distributed base stations. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the $3^{rd}$-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology.

A configuration defined by the 3GPP in the 5G NR specification, referred to as Non-Standalone Architecture (NSA), allows the simultaneous use of 4G and 5G systems for communications with a communication device. Specifically, NSA uses Dual Connectivity (DC), in which a communication device uses both an LTE radio and an NR radio for downlink receptions from and uplink transmissions to corresponding LTE and NR base stations. An LTE carrier is used for control-plane signaling and for user-plane communications. An NR carrier is used for additional user-plane bandwidth as well as for data download or transmission throughput. In a scenario such as this, the LTE carrier is said to "anchor" the communication session. The NR carrier is established and maintained when a device is in connected mode. During idle mode, the device maintains only an LTE connection.

Communication devices such as smartphones often have a status bar that shows, among other things, the signal strength and/or signal quality of the current wireless connection with a base station. In addition, the status bar may have a network indicator, such as an icon or symbol, that indicates the network type being used for the current wireless connection or that is currently available for future connections. For example, the network indicator might comprise a "4G LTE" symbol when 4G LTE communications are available and 5G symbol when 5G NR communications are available.

When in idle mode, however, the NR components of the communication device are inactive. Because of this, the communication device is unable to measure 5G signal strength, even though 5G NSA communications may be currently available. As a result, the communication device is often unable to accurately display 5G signal strength and/or determine whether to display the 5G symbol.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a block diagram of a communication network that implements both 4G and 5G radio access technologies for Non-Standalone (NSA) communications.

FIG. 2 is a lookup table that may be stored by a communication device for use in determine whether 5G communications are currently available.

DETAILED DESCRIPTION

Figure 3:
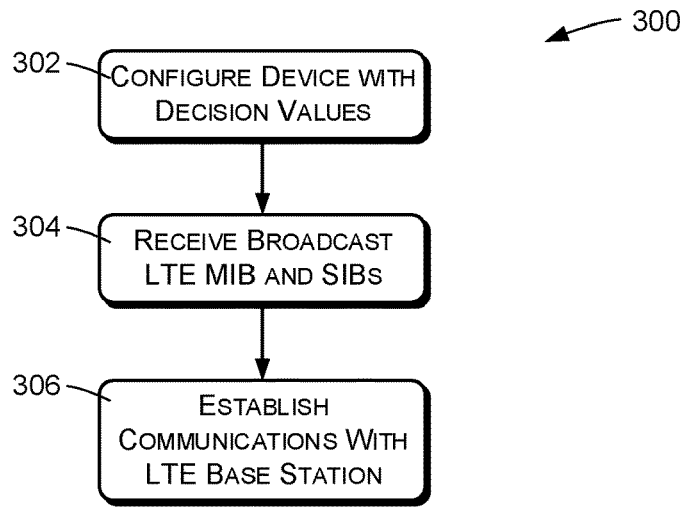
FIG. 3 is a flow diagram illustrating an example method that may be performed in conjunction with the described techniques.

Described herein are techniques for determining which of multiple network identifiers to display on the status bar of a wireless communication device, when the device is operating on a cellular network of a wireless communications provider that has areas of dual signal coverage. Network identifiers might include, for example, symbols that indicate 3G, 4G, LTE, 5G, and so forth, corresponding to different wireless network standards.

The described techniques may be useful when a wireless communication device is within an area that is supported by both 4G and 5G technologies, for example. In particular, the described techniques may be useful when a communication device supports Non-Standalone Architecture (NSA). When using NSA, the device does not necessarily maintain a 5G communication channel and may therefore be unable to determine 5G signal strength for purpose of determining whether to display symbol indicating the availability of 5G communications and services.

When using NSA, an initial connection between the device and an LTE base station is configured based on LTE system information. System information in the LTE environment is broadcast by the LTE base station in data objects referred to as System Information Blocks (SIBs). System information may include information relating to cell access, scheduling, communication channels and frequencies, network identifiers, tracking area codes (TACs), cell IDs, status, power levels, paging information, neighboring cells, etc.

Cellular communication devices receive the LTE system information prior to establishing connections with LTE base stations, as well as during the connections. When there are changes in the system information of an LTE base station, connected cellular communication devices are notified and the changes are retrieved from subsequently broadcast SIBs.

In a cell that supports NSA, and that therefore has both LTE and NR base stations, the LTE base station is configured to broadcast information indicating that the cell supports NSA Dual Connectivity. This information may be included in an LTE SIB. In accordance with 3GPP TS 36.331 Release 15, this information is conveyed by a single-bit value called "upperLayerIndication" within what is known as SIB2. This value may be referred to at times herein as a 5G availability indicator.

A wireless communication device, often referred to in this environment as a User Equipment (UE) or Mobile Station (MS), monitors the broadcast channels of one or more nearby LTE base stations in order to receive LTE SIBs. When in a cell that supports NSA, the upperLayerIndication value may indicate NSA support, but the device may nevertheless be in a location where NR signals of the cell are too weak to be used. This may be particularly problematic when the device is in idle mode, because when in idle mode the device does not maintain an active 5G communication channel and is therefore unable to measure NR signal strength.

When the device receives a SIB indication that the current LTE base station and network cell support NSA, the device determines whether to display the 5G symbol based on (a) the currently measured 4G signal strength and (b) an appropriate one of multiple stored decision values. In embodiments described herein, the decision values correspond respectively to different combinations of 4G and 5G frequency bands that are currently available for NSA communications. As an example, the device may have a stored lookup table that lists a signal strength adjustment for each combination of 4G and 5G frequency bands.

In some embodiments, the decision values may comprise adjustment amounts that are used to calculate an estimated 5G signal strength based on the measured 4G signal strength. The estimated 5G signal strength is then compared to a signal strength threshold to determine whether 5G services are currently available. The signal strength threshold is equal to the approximate minimum signal strength that would be needed to support NR data communications. If the estimated 5G signal strength is greater than the signal strength threshold, the device displays a 5G symbol to inform the user of the device that the device is currently able to use 5G services. Otherwise, the device displays the 4G or LTE symbol.

In some embodiments, the stored decision values may comprise thresholds, and the measured 4G signal strength may be compared to the appropriate one of the thresholds to determine whether to display the 5G symbol.

The decision values may be determined based on in-the-field testing and may be stored in the device before or during provisioning. Alternatively, these values may be obtained during operation from the current LTE base station. In some embodiments, different adjustment values may be used for different network cells.

The described techniques improve user experience by more accurately informing the user regarding whether 5G is currently available. Furthermore, this can be achieved without activating NR components of the device, thereby avoiding the power consumption that would result from the device having to actively monitor and measure NR signals.

Although the techniques are described in the context of 4G and 5G networks, the techniques described herein may also be used with different network types, standards, and technologies. That is, the techniques may be used more generally for first and second wireless communication networks, where a 4G network is an example of the first wireless communication network and a 5G network is an example of the second wireless communication network.

FIG. 1 illustrates relevant high-level components of a cellular communication system 100 such as might be implemented by a cellular communications provider. The communication system 100 has a 4G network core 102. The communication system 100 also has multiple cell sites 104, only one of which is shown in FIG. 1 for purposes of discussion. Although not shown, some networks may include a 5G network core.

The illustrated cell site 104 has 4G and 5G cellular access points, and therefore supports both 4G and 5G communications. The 4G access point is implemented as an LTE base station 106, also referred to as an eNodeB, a master eNodeB, or a master base station. The 5G access point is implemented as an NR base station 108, also referred to as a gNodeB, a secondary gNodeB, or a secondary base station. The 4G network core 102 communicates with the LTE base station 106 and the NR base station 108. Radio communications are controlled by the LTE master base station. Other communication paths may be used in other embodiments. Note that some cell sites of the system 100 might lack 5G support, and may support only 4G services and communications.

FIG. 1 shows a single cellular communication device 110, which may be one of many such devices that are configured for use with the communication system 100. In the described embodiment, the communication device 110 supports both 4G LTE and 5G NR networks and communications. Accordingly, the communication device 110 has an LTE radio (not shown) that communicates wirelessly with the LTE base station 106 of the cell site 104 and an NR radio (not shown) that communicates wirelessly with the NR base station 108 of the cell site 104.

The communication device 110 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the communication device 110 may be referred to as a User Equipment (UE) or Mobile Station (MS).

The communication device 110 may communicate through either or both of the LTE base station 106 and the NR base station 108. In some cases or embodiments, the communication device 110 may support Dual Connectivity communications, in which a single communication session might simultaneously use both a 4G connection and a 5G connection. More specifically, the communication device 110 may operate using what is referred to as a Non-Standalone Architecture (NSA), using 5G NR radio technologies to augment 4G LTE communication capabilities. When using NSA, the communication device 110 uses both an LTE carrier and an NR carrier for downlink data reception and uplink transmissions.

When the communication device 110 is in idle mode, it receives an LTE Radio Resource Control (RRC) signal 112 from the LTE base station 106. The RRC signal 112 may contain information regarding capabilities and characteristics of the LTE base station 106. For example, RRC messaging may include information needed by a communication device to establish bi-directional communications with the LTE base station 106. In the LTE environment, at least some of this information is provided in a periodically broadcast master information block (MIB) and multiple system information blocks (SIBs). FIG. 1 shows a single SIB 114 being broadcast by the LTE base station 106. The SIB 114 can be received by multiple communication devices, including the illustrated communication device 110.

In certain implementations, a network availability indicator is included in one of the SIBs 114 that is broadcast periodically by the LTE base station 106. The network availability indicator indicates whether the LTE base station 106 is in a geographic area within which 5G services are available. More specifically, the LTE base station includes the network availability indicator when the LTE base station is associated with and/or collocated with a 5G base station and configured to support NSA Dual Connectivity in conjunction with the 5G base station. In some embodiments, the network availability indicator may comprise an "upperLayerIndication" value that is contained in SIB2, in accordance with 3GPP TS 36.331 Release 15.

It is assumed, for purposes of discussion, that the device 110 of FIG. 1 is in idle mode, with no active carrier or communication channel between the base station 108 and the device 110. During idle mode, the device 110 may not monitor or measure any signals that are broadcast by the NR base station 108. This allows the device 110 to disable or avoid using its NR components and to reduce the power consumption that would otherwise result from monitoring NR signals during idle mode.

The communication device 110 has a display 116 for presenting information and for interacting with a user. A status bar 118 is typically shown at the top of the display 116. In this example, the status bar 118 has a signal strength meter 120, a carrier identifier 122, and a network identifier 124. The status bar 118 also indicates the current time of day in a time field 126.

The signal strength meter 120 shows the strength and/or quality of signals or communication channels that have been established with the LTE base station 106 and/or the NR base station 108. The carrier identifier 122 corresponds to the network carrier or provider whose signals are being used for communications.

The network identifier 124 indicates the type of network that is being used by the communication device 110 or that is available to the communication device 110. In the example described herein, the network identifier 124 indicates LTE when operating in a 4G LTE environment, and 5G when operating in a 5G NR environment. Other embodiments may of course have different types of networks, corresponding to different communication protocols, and may use symbols corresponding to those communication protocols.

It is generally intended for the status bar 118 to show a network identifier 124 corresponding to the most advanced or highest-capability cellular network that is available for use by the communication device 110. In the system described herein, a 5G symbol is displayed whenever the communication device 110 is in a location where 5G NR communications are available, including 5G NSA communications.

FIG. 2 shows an example of a lookup table 202 that may be stored by the device 110 for use in determining whether to display an indication, such as a 5G symbol, that 5G services are currently available to the device 110. The lookup table 202 has rows that correspond respectively to different 4G frequency bands. The lookup table 202 has columns that correspond respectively to different 5G frequency bands. The table 202 has decision values C1, C2, ... C9, corresponding respectively to different combinations of 4G and 5G frequency bands. For example, 4G frequency bands may include bands referred to as B2 (PCS) and B66 (AWS). 5G frequency bands may include bands referred to as n41 (2.5 GHz), n71 (600 MHz), n260 (39 GHz) and n261 (28 GHz).

The decision values are used in combination with a measured 4G signal strength to determine whether 5G services are currently available and whether to display the 5G network indicator. The decision values are determined based on in-the-field testing and comparisons of 5G signal strengths to 4G signal strengths for different frequency bands. 5G signals generally have lower propagation and penetration characteristics at high frequencies (e.g. 28 GHz and 39 GHz). Because of this, 5G signals may in some cases attenuate faster than 4G signals. The 4G signal strengths will be used to estimate levels of 5G signal strengths (if available) as well as whether 5G connectivity and services are available. The decision algorithm for mid and low frequencies in Frequency Range 1 or FR1 for Sub-7 GHz frequency (in 3GPP terminology) may be different from that for high frequencies in Frequency Range 2 or FR2 for frequency from 24.25 GHz to 52.6 GHz).

In some embodiments, the decision values may comprise thresholds that the current 4G signal strength is compared against to determine whether to display the 5G symbol. In other cases, the decision values may comprise adjustment amounts to be used in combination with a measured LTE Reference Signal Received Power (RSRP) to estimate an NR RSRP, which is then compared to a predetermined threshold to determine whether to display the 5G symbol. For example, an adjustment value may be a decibel-milliwatt (dBm) value that is subtracted from the LTE RSRP to yield an estimated 5G RSRP. Alternatively, an adjustment value may be a fraction or other value that is multiplied with the 4G RSRP to yield the estimated 5G RSRP.

In some embodiments, the table 202 may be stored in the memory of the communication device 110 during provisioning. In other cases, the communication device 110 may obtain the decision values from LTE and/or NR base stations.

Figure 4:
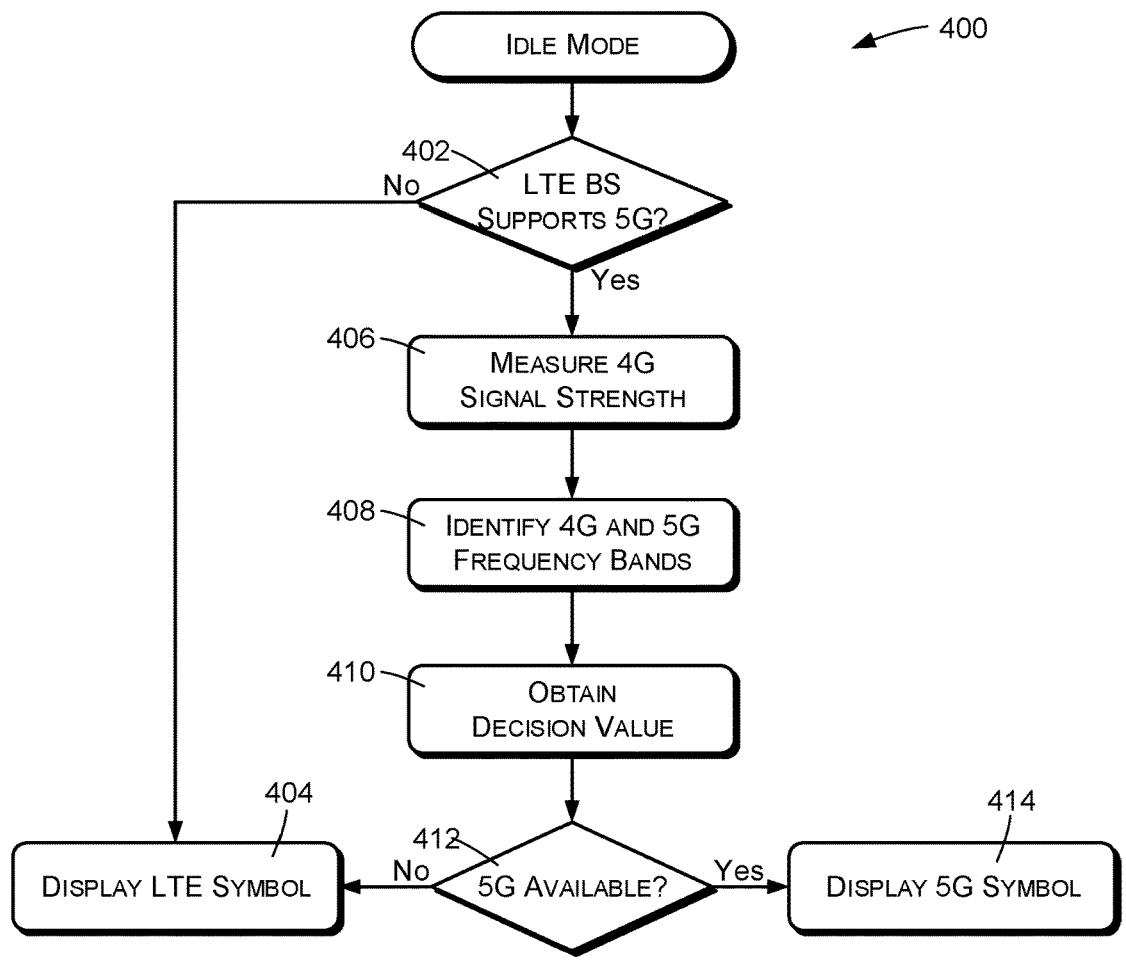
FIG. 4 is a flow diagram illustrating an example method that may be used when the communication device is in idle mode to determine whether to display an indication that 5G communications are currently available to the communication device.
Figure 5:
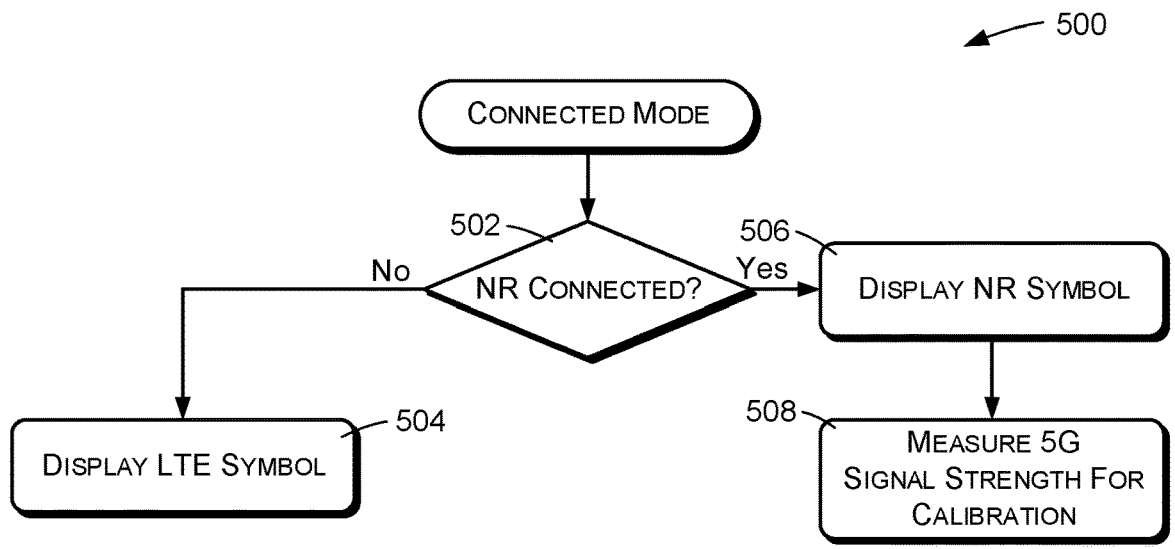
FIG. 5 is a flow diagram illustrating an example method that may be used when the communication device is in connected mode to determine whether to display an indication that 5G communications are currently available to the communications device.

FIGS. 3-5 illustrate example methods that may be performed by a cellular communication device, such as a cellular telephone or smartphone, to determine which of multiple network symbols should be displayed in the status bar of the communication device. The example methods may be performed in an environment in which a first wireless communication network, such as a 4G network, serves multiple geographic areas. The cellular communication device communicates through a first, master base station, to access the 4G cellular communication network. The communication device communicates through a second, secondary base station, to access a 5G cellular communication network.

The first, master base station is implemented in accordance with a first wireless communication standard, such as LTE, and is referred to as an LTE base station. The second cellular access point is implemented in accordance with a second radio access technology, such as NR, and is referred to below as an NR base station.

FIG. 3 shows an example method 300 that may be performed when configuring a cellular communication device and establishing communications with the cellular communication device. An action 302 comprises configuring the cellular communication device by storing multiple decision values in non-volatile memory of the device. As an example, the decision values may be stored as a lookup table indexed by 4G frequency bands and 5G frequency bands, such as the lookup table 202 of FIG. 2.

The decision values correspond respectively to different combinations of 4G and 5G radio frequency bands. In some cases, the decision values are adjustment values that are used with the currently measured 4G signal strength to calculate an estimated 5G signal strength. In other cases, the decision values may comprise thresholds against which the current 4G signal strength is compared to determine whether to display the 5G symbol.

An action 304, performed by the cellular communication device during operation, comprises receiving information over a broadcast channel of the LTE base station. In certain embodiments, for example, the information comprises a Radio Resource Control (RRC) message containing an LTE Master Information Block (MIB) and one or more LTE System Information Blocks (SIBs). The MIB and SIBs contain information that is used by the communication device to attach to the LTE base station. Most relevant to this discussion, a SIB referred to as SIB2 may include an "upperLayerIndication" value indicating that the LTE base station supports Non-Standalone Architecture (NSA) Dual Connectivity in conjunction with the NR base station. The "upperLayerIndication" value may be referred to at times herein as a 5G availability indicator.

The 5G availability indicator, when present, indicates that 5G services are generally available in the geographic area within which the communication device is located. In many cases, this indication may indicate that that the LTE base station is collocated with and/or otherwise associated with an NR base station and configured to support NSA Dual Connectivity in conjunction with the NR base station.

The action 304 might be performed, for example, when the communication device is turned on and scans LTE frequency bands to find a suitable LTE signal, or when the communication device is handed off to a new cell.

An action 306, performed by the cellular communication device during operation, comprises establishing communications with the LTE base station. For example, the action 306 may comprise camping on or attaching to the LTE base station, based on information received in the MIB and SIBs. As the communication device is moved about, it may camp on different LTE base stations of other network cells, after obtaining MIBs and SIBs from those LTE base stations.

The actions 304 and 306 are performed repeatedly as the communication device moves between and within various network cells.

FIG. 4 shows an example method 400, illustrating actions that may be performed when the communication device is in idle mode in order to display an appropriate network identifier. An action 402 comprises determining whether 5G communications, such as NR and/or NSA communications, are currently available. In some embodiments, the action 402 may comprise determining whether the communication device has received, from the LTE base station, an indication that the LTE base station is collocated or otherwise associated with an NR base station to support NSA communications, and/or that 5G services are generally available in the geographic area within which the communication device is located. In some embodiments, the action 402 may comprise evaluating SIB2 to determine whether the 5G availability indicator "upperLayerIndication" is present and/or is set a positive, "TRUE", or "ON" value. If the "upperLayerIndication" value is not present and/or is not set to positive, "TRUE", or "ON" value, an action 404 is performed of displaying an LTE symbol, a 4G symbol, or some other symbol that does not indicate 5G availability.

An action 406 is performed in response to receiving a 5G availability indicator indicating that 5G services are available. The action 406 comprises measuring 4G signal strength, such as LTE RSRP of a signal transmitted by the LTE base station. Specifically, the 4G signal strength can be measured and reported by LTE RF components of the communication device. LTE RSRP reporting may in some cases rely on the measurement of Cell Reference Symbol (CRS) signal strength on an LTE downlink.

An action 408 is then performed. The action 408 comprises identifying a 4G frequency band and a 5G frequency band that will be used in a subsequent NSA communication session with the LTE base station and the associated NR base station. The actual dual connectivity combinations of 4G frequency (LTE anchor cell) and 5G frequency (NR secondary dual connected cell) may be communicated in RRC messages. Once the ENDC (EUTRA-NR Dual Connectivity) combination is configured, the signal strength decision will be enabled for these frequencies.

A subsequent action 410 comprises selecting and/or obtaining a decision value from the memory of the communication device. In some embodiments, this selection may be made based on one or both of the identified 4G and 5G frequency bands. For example, the action 410 may comprise looking up the appropriate decision value from a lookup table such as the lookup table 202 of FIG. 2, based on the identified 4G frequency band and the identified 5G frequency band, where each combination of 4G and 5G frequencies has a corresponding decision value.

In some embodiments, the action 410 may comprise receiving an appropriate decision value from the current LTE base station. For example, information broadcast by each LTE base station may include decision values, appropriate for that LTE base station, corresponding to 4G and 5G frequency bands used by that LTE base station and the associated NR base station.

An action 412 comprises determining, based on the currently measured 4G signal strength and the selected decision value, whether 5G communications and services are currently available to the communication device. If 5G communications and services are currently available, an action 414 is performed of displaying a 5G symbol on the cellular communication device, indicating that NR radio access technology and 5G services are currently available to the cellular communication device. The 5G symbol can be any symbol that is known to be associated with 5G communications or that otherwise identifies the 5G network. For example, the symbol may comprise the text "5G".

Otherwise, if 5G services are not currently available, the action 414 is performed of displaying a 4G identifier in the status bar or other display area of the communication device. The LTE identifier can be any symbol that is known to be associated with LTE communications or that otherwise identifies the LTE network. Alternatively, a symbol corresponding to any other type of available network, such as a 3G network, may be displayed. If 5G services are not available, the 5G symbol is not displayed.

The action 412 may comprise determining an estimated 5G signal strength based at least in part on the selected decision value. More specifically, the action 412 may comprise applying the decision value, previously selected in the action 410, to the measured 4G signal strength obtained in the action 406. In some embodiments, the decision value may comprise an adjustment value, and the action 412 may comprise calculating the estimated 5G signal strength based on the measured 4G signal strength and the selected adjustment value. For example, the action 412 may comprise subtracting the adjustment value from or adding the adjustment value to the measured 4G signal strength to obtain the estimated 5G signal strength. In other embodiments, the action 412 may comprise multiplying the 4G signal strength and the adjustment value.

The action 412 may further comprise determining whether the estimated 5G signal strength satisfies a predetermined threshold 5G signal strength. For example, the action 412 may comprise determining whether the estimated 5G signal strength is greater than a predetermined minimum signal strength such as RSRP. If the estimated 5G signal strength is greater than the predetermined minimum signal strength, the communication device concludes that 5G is currently available. If the estimated 5G signal strength is not greater than the predetermined minimum signal strength, the communication device concludes that 5G is not currently available.

In some embodiments, the stored decision values may comprise pre-calculated 4G signal strength thresholds rather than adjustment values. In embodiments such as this, the action 412 may comprise comparing the measured 4G signal strength to a threshold value selected in the action 410. If the measured 4G signal strength satisfies the threshold, e.g., the 4G signal strength is greater than the threshold, the communication device concludes that 5G is currently available. Otherwise, if the measured 4G signal does not satisfy the threshold, the communication device determines that 5G is not currently available.

The actions of FIG. 4 are repeated to periodically while the communication device is in idle mode to update the displayed network symbol. For example, these actions may be repeated every several seconds, or in response to other conditions or events such as when the cellular communication device moves to a new cell and corresponding LTE base station.

In some embodiments an adjustment value may be obtained from the LTE base station in the action 410, rather than from data that has been previously stored in the device memory. In this case, the action 410 might be performed whenever entering a new cell. The LTE base station may provide an appropriate correction value for that LTE base station and/or may provide multiple adjustment values corresponding to multiple combinations of 4G and 5G frequency bands.

In some embodiments, certain of the actions described above with reference to FIG. 4 may be omitted during some iterations of the actions. For example, the action 408 of identifying the 4G and 5G frequency bands may in some embodiments be performed whenever entering a new cell and may not need to be performed again until moving to a different cell.

FIG. 5 shows an example method 500 that may be performed repeatedly when the communication device is in connected mode. An action 502 comprises determining whether there is an active NR connection. If there is no active NR connection, an action 504 is performed, comprising displaying the LTE symbol. If there is an active NR connection, an action 506 is performed of displaying the NR symbol.

In some implementations, the communication device may perform an action 508 when there is an active NR connection. The action 508 comprises calibrating one or more of the stored decision values based on a measured 5G signal strength as compared to the current 4G signal strength.

Figure 6:
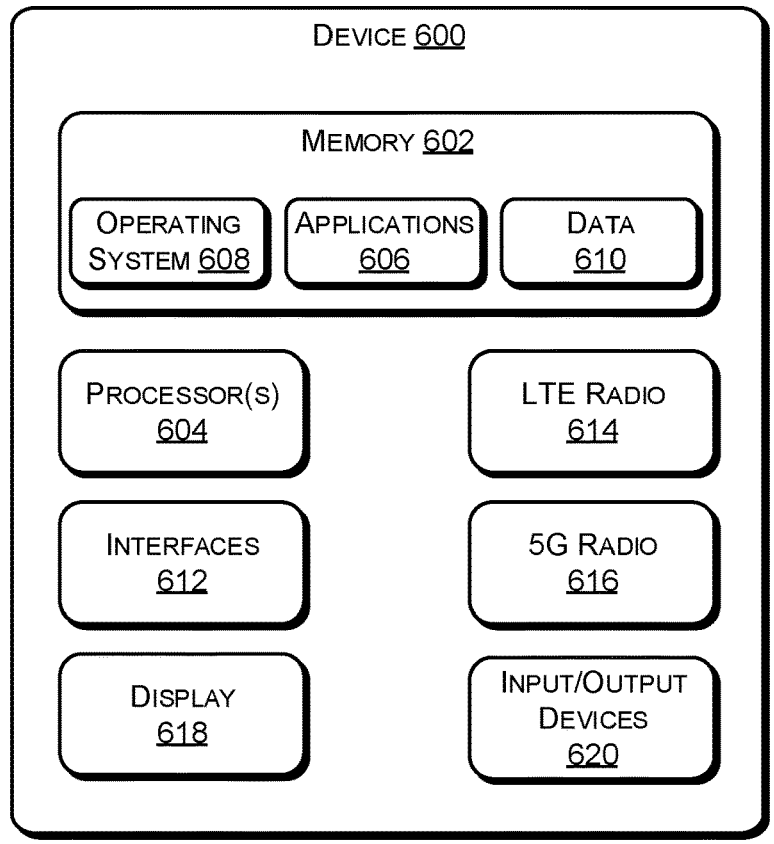
FIG. 6 is a block diagram of an example mobile communication device that may be configured in accordance with the described techniques.

FIG. 6 illustrates an example cellular communication device 600 that may be used to implement the techniques described herein. Certain actions of the methods shown in FIGS. 3-5, for example, may be implemented by a device such as the device 600.

The device 600 is an example of a communication device 110 as shown in FIG. 1. FIG. 6 shows only basic, high-level components of the device 600.

The device 600 may include memory 602 and a processor 604. The memory 602 may include both volatile memory and non-volatile memory. The memory 602 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 602 may include a SIM (subscriber identity module), which is a removable smart card used to identify a user of the device 600 to a service provider network.

The memory 602 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 602 may in some cases include storage media used to transfer or distribute instructions, applications, and/or data. In some cases, the memory 602 may include data storage that is accessed remotely, such as network-attached storage that the device 600 accesses over some type of data communication network.

The memory 602 stores one or more sets of computer-executable instructions (e.g., software) such as programs that embody operating logic for implementing and/or performing desired functionality of the device 600. For, the operating logic may be designed to implement the example methods shown in FIGS. 3-5. The instructions may also reside at least partially within the processor 604 during execution thereof by the device 600. Generally, the instructions stored in the computer-readable storage media may include various applications 606 that are executed by the processor 604, an operating system (OS) 608 that is also executed by the processor 604, and data 610.

In some embodiments, the processor(s) 604 is a central processing unit (CPU), a graphics processing unit (GPU), both CPU and GPU, or other processing unit or component known in the art. Furthermore, the processor(s) 604 may include any number of processors and/or processing cores. The processor(s) 604 is configured to retrieve and execute instructions from the memory 602.

The device 600 may have interfaces 612, which may comprise any sort of interfaces known in the art. The interfaces 612 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 600 may also have an LTE radio 614 and a 5G radio 616, which may be used as described above for implementing NSA Dual Connectivity in conjunction with an eNodeB and a gNodeB. The radios 614 and 616 transmit and receive radio frequency communications via an antenna (not shown).

The device 600 may have a display 618, which may comprise a liquid crystal display or any other type of display commonly used in telemobile devices or other portable devices. For example, the display 618 may be a touch-sensitive display screen, which may also act as an input device or keypad, such as for providing a soft-key keyboard, navigation buttons, or the like.

The device 600 may have input and output devices 620. These devices may include any sort of output devices known in the art, such as a display (already described as display 618), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by a cellular communication device that supports Non-Standalone Architecture (NSA) communications using 4th-Generation (4G) and 5th-Generation (5G) radio access technologies, the method comprising:

storing, in memory of the cellular communication device, multiple values for determining whether to display an indication that 5G services are available to the cellular communication device, wherein the values correspond respectively to different combinations of 4G and 5G radio frequency bands;

receiving, from a 4G base station, an indication that the 4G base station is associated with a 5G base station to support NSA communications;

in response to receiving the indication, measuring a 4G signal strength of a 4G signal transmitted by the 4G base station;

identifying a 4G frequency band, of multiple 4G frequency bands, that will be used by the cellular communication device for the NSA communications;

identifying a 5G frequency band, of multiple 5G frequency bands, that will be used by the cellular communication device for the NSA communications;

selecting a value, of the multiple values, based at least in part on the 4G frequency band and the 5G frequency band, wherein the value comprises a threshold; and determining whether to display the indication based at least in part on the 4G signal strength and the value, wherein determining whether to display the indication comprises comparing the 4G signal strength to the threshold.

2. The method of claim 1, wherein determining whether to display the indication comprises:

during idle mode operation of the cellular communication device, determining an estimated 5G signal strength of a 5G signal transmitted by the 5G base station based at least in part on the 4G signal strength and the value; and comparing the estimated 5G signal strength to a threshold.

3. The method of claim 2, wherein determining the estimated 5G signal strength comprises subtracting the value from the 4G signal strength.

4. The method of claim 2, wherein determining the estimated 5G signal strength comprises multiplying the 4G signal strength by the value.

5. The method of claim 1, further comprising:

during connected mode operation of the cellular communication device, measuring an actual 5G signal strength; and calibrating the value based at least in part on the actual 5G signal strength.

6. A method performed by a cellular communication device that supports Non-Standalone Architecture (NSA) communications using first and second radio access technologies, the method comprising:

determining that a first base station supports NSA communications in conjunction with a second base station, wherein the first base station uses the first radio access technology and the second base station uses the second radio access technology;

obtaining an adjustment value based at least in part on a first frequency band that will be used by first base station for the NSA communications and a second frequency band that will be used by the second base station for the NSA communications;

during idle mode operation of the cellular communication device, measuring a first signal strength of the first base station; and determining an estimated second signal strength of the second base station based at least in part on the first signal strength, wherein determining the estimated second signal strength comprises calculating the estimated second signal strength based at least in part on the adjustment value.

7. The method of claim 6, further comprising displaying an indication of the estimated second signal strength.

8. The method of claim 6, further comprising:

determining that the estimated second signal strength satisfies a threshold; and in response to determining that the estimated second signal strength satisfies the threshold, displaying an indication that the second radio access technology is currently available.

9. The method of claim 6, wherein determining that the first base station supports NSA communications comprises receiving an indication from the first base station that the first base station supports NSA communications.

10. The method of claim 6, wherein determining the estimated second signal strength comprises selecting a value, from multiple values stored by the cellular communication device, based at least in part on (a) the first signal strength, (b) a first frequency band used by the first base station for communicating with the cellular communication device, and (c) a second frequency band used by the second base station for communicating with the cellular communication device.

11. The method of claim 6, further comprising obtaining an adjustment value based at least in part on a first frequency band that will be used by first base station for the NSA communications and a second frequency band that will be used by the second base station for the NSA communications, wherein determining the estimated second signal strength comprises at least one of:

adding the adjustment value to the first signal strength;

subtracting the adjustment value from the first signal strength; or multiplying the first signal strength by an adjustment value.

12. A cellular communication device, comprising:

one or more processors; and one or more non-transitory computer-readable media storing computer-executable instructions that, when executed by the one or more processors, cause the one or more processors to perform actions comprising:

determining that a first base station supports NSA communications in conjunction with a second base station, wherein the first base station uses a first radio access technology and the second base station uses a second radio access technology; and during idle mode operation of the cellular communication device:

measuring a first signal strength of a signal transmitted by the first base station;

selecting a value, of multiple values stored by the cellular communication device, based at least in part on a first frequency band used by one of the first and second base stations; and determining whether to display an indication that the second radio access technology is currently available to the cellular communication device, based at least in part on the value, wherein determining whether to display the indication comprises comparing the value to a signal strength of the first base station.

13. The cellular communication device of claim 12, wherein selecting the value is further based at least in part on a second frequency band used by another of the first and second base stations.

14. The cellular communication device of claim 12, wherein determining whether to display the indication comprises determining an estimated signal strength the second base station based at least in part on the value.

15. The cellular communication device of claim 14, wherein determining whether to display the indication further determining that the estimated signal strength of the second base station satisfies a threshold.

16. The cellular communication device of claim 14, the actions further comprising displaying an indication of the estimated signal strength of the second base station.

17. The cellular communication device of claim 12, the actions further comprising:

during connected mode operation of the cellular communication device, measuring an actual signal strength of the second base station; and calibrating the value based at least in part on the actual signal strength of the second base station.

* * * * *